United States Patent [19]

Nantel

[11] Patent Number: 4,837,910
[45] Date of Patent: Jun. 13, 1989

[54] METHOD AND APPARATUS FOR ASSEMBLING ANTI-FRICTION BEARINGS

[76] Inventor: Jean H. Nantel, 624 Manotic, Lakeville, Mich. 48036

[21] Appl. No.: 126,725

[22] Filed: Nov. 30, 1987

[51] Int. Cl.$^4$ ............................................. B23P 19/04
[52] U.S. Cl. .......................... 29/149.5 R; 29/148.4 A; 29/724
[58] Field of Search .................... 29/148.4 A, 149.5 R, 29/149.5 C, 724

[56] References Cited

U.S. PATENT DOCUMENTS

4,357,749  11/1982  Lira ................................. 29/148.4 A
4,425,703  1/1984   Rise ....................................... 29/724

Primary Examiner—Howard N. Goldberg
Assistant Examiner—Taylor J. Ross
Attorney, Agent, or Firm—Body, Vickers & Daniels

[57] ABSTRACT

Mehtod and apparatus is disclosed for use in a machine which collects and assembles needle bearings in an annular array and uses a mandrel to insert the array into a cylindrical opening in a receiving member. The mandrel is centered within the bore of a recover block to define an annular space into which a discrete number of needle bearings are singularly fed from an especially configured track which holds a vertical, serpentine column of needle bearings. A push rod engages the column to positively force a discrete number of bearings into the space while a grease packing is inserted about the bearings as they fill the space.

19 Claims, 3 Drawing Sheets

PRIOR ART

METHOD AND APPARATUS FOR ASSEMBLING ANTI-FRICTION BEARINGS

This invention relates generally to a method and apparatus for assembling anti-friction bearings and more particularly to a machine for assembling needle bearings and the like into a cylindrical opening formed within gears, bearings, joints and the like.

The invention is particularly applicable to assembling needle bearings within the bore of a gear and will be discussed with particular reference thereto. However, it will be appreciated by those skilled in the art that the invention may have broader applications and may be used for assembling antifriction bearings other than needle type bearings within the opening of a rotatable member.

BACKGROUND OF THE INVENTION

There are countless situations where a gear, bearing, joint and the like must rotate about a shaft under heavy radial loads and require anti-friction bearings, particularly needle bearings, in between the rotating member and the shaft. While needle bearings can be inserted into a conventional anti-friction bearing retainer which is secured within the bore or hub of the rotating member, it is common practice for the needle bearings to be simply inserted into the hub of the rotating member and the rotating member slipped over the shaft. The hub or bore is liberally greased and the needle bearings, once inserted into the bore, are maintained in proper position and attitudinal alignment within the bore by the grease, the grease also providing lubrication for the bearings. The rotating member with needle bearings packed in its hub by grease is usually pushed onto the shaft by the use of a mandrel.

The mandrel concept is also used in initially packing the needle bearings into the hub of the gear or rotating member after which the gear is shipped (sometimes with a pilot or dummy shaft within its bore) to the site where final application of the gear to the shaft is made. Essentially packing the bearings into the gear's hub is achieved by the use of a recover block having a bore extending therethrough and a bearing slot in communication with the bore through which the bearings are fed. The diameter of the bore in the recover block is equal to the diameter of the bore of the gear member. A mandrel in the form of a stepped shaft having a first diameter portion approximately equal in diameter to the shaft on which the gear member is to be applied and a second diameter portion having a diameter greater than the first diameter portion but less than the diameter of the receiver block's bore, cooperates with the recover block to collect the needle bearings. The length of the first and second portions of the stepped shaft are at least equal to the length of the bore in the recover block which in turn is at least equal in length to the bore in the gear member.

The gear member with grease liberally applied within its bore is brought, by means of a transfer station, into concentric alignment with the bore of the recover block and closely adjacent to one axial end of the recover block. The first diameter portion of the mandrel is inserted into the recover block from the opposite axial end in concentric relationship with the recover block's bore. Needle bearings are then fed by gravity through the bearing slot in the recover block into the annular space between first diameter shaft portion and the bore of the recover block. After the annular space is filled with needle bearings, the second shaft diameter portion pushes the needle bearings out of the recover block and into the hub of the gear. The bearings are retained by the grease in the hub of the gear and the first diameter portion retracted from the gear member and again positioned in concentric relationship within the recover block.

The gear is then rolled on the transfer station to another position whereat a pilot shaft is inserted into the member from the opposite end and laterally moved to determine if all the needle bearings are positioned within the bore or hub of the gear. The pilot shaft can then be left in the gear for transporting purposes or removed, in which event, the grease itself acts as a packing to maintain the bearings within the bore of the gear during transit.

The feed mechanism for loading the needle bearings into the recover block in the annular bearing space comprised a track which holds a vertical column of needle bearings positioned over and in registry with the bearing slot in the recover block. The weight of the needle bearings in the column provided the force to load the needles into the annular bearing space. To provide some means of controlling the vertical drop of the needle bearings, the track was constructed to comprise horizontal passage segments perpendicular to vertical passage segments so that the actual downward force exerted on the lowest bearing in any vertical segment of the trace was attributed only to the weight of the needle bearings in that vertical segment. By constructing the track in such a manner, the flow of needle bearings into the annular bearing space proceeded in a controlled manner and was enhanced by oscillating the mandrel to result in a fairly reliable arrangement for loading the needle bearings into the annular bearing space.

While the arrangement described above was satisfactory, the cycle time of the assembly was limited by the time it took the needles to drop by gravity to fill the annular bearing space. In addition, it was possible for the bearings to assume a cocked alignment within the annular bearing space thus preventing the bearings from completely filling such space and resulting in a defective assembly.

SUMMARY OF THE INVENTION

Accordingly, it is a principal object of the present invention to provide an improvement in the method of assembling bearings and in the apparatus of the prior art bearing assembly machine.

This object along with other features of the invention is achieved in a system for assembling anti-friction needle bearings and the like into a cylindrical bore of a receiving member such as gears and the like so that the receiving member can be subsequently positioned, with the bearings packed therein, on a shaft or like cylindrical object. The system includes a recover block having a cylindrical bore longitudinally extending therethrough of a diameter substantially equal to that of the receiving object. The recover block has a longitudinally extending bearing slot extending from one of the block's sides into the block's bore and a forward axial face at one end of the block's bore and a rearward axial face at the other end of the block's bore. A collecting, stepped shaft mandrel is provided. The mandrel has a first, longitudinally extending cylindrical shaft portion of a first diameter equal to that of the shaft to which the receiving member is finally assembled to and a second longitudinally extending cylindrical shaft portion of a second diameter greater than the first diameter but smaller than the diameter of the bore in the recover block. Transfer station means are provided for positioning the bore of the receiving object concentrically with the bore in the recover block and closely adjacent the rearward axial face of the recover block. Mandrel actuating means are provided for longitudinally moving and positioning the mandrel from a first position whereat the first shaft diameter portion is concentrically positioned within the bore of the receiving block opening to define an annular bearing space therebetween and a second position whereat the second shaft portion is concentrically positioned within the bore of the receiving block while the first shaft portion is concentrically positioned within the bore of the receiving object. Pin feeding means are then provided to positively feed a discrete number of needle bearings by an external force through the bearing slot to insure that the annular bearing space is completely filled with needle bearings, each needle bearing in proper longitudinally-extending alignment when the mandrel actuating means is in its first position, and the mandrel actuating means effective in its second position to transfer the annular array of needle bearings into the bore in the receiving object.

In accordance with another object of the invention, lubricating means are provided in the recover block to inject grease into the annular bearing space during and-/or after the time the pin actuating means is inserting the bearings into the annular bearing space. The mandrel actuating means also includes means to rotate the first diameter portion of the stepped shaft while the lubricating means actuated to provide a film of grease substantially surrounding and filling in the spaces between each needle bearing thus providing a grease packing with improved adhesion to maintain the bearings in their proper alignment while also providing improved lubrication of the bearings when the receiving object is assembled to the shaft.

In accordance with yet another aspect of the invention, track means in registry with the bearing slot are provided. The track means include a track guide of an especial configuration which allows the pins to be vertically fed, one on top of the other, into the guide while preventing an uncontrolled free fall of the needle bearings from the bottom of the guide. The track means also includes kicker means which selectively engages and disengages the track guide and selectively pushes and positively forces a predetermined number of needle bearings into the annular bearing space to insure the complete filling of the annular bearing space with the bearings positioned in their proper attitudinal relationship while materially reducing the time to fill the annular bearing space.

In accordance with yet another aspect of the invention, the track guide may be generally described as serrated but more specifically, is formed from reversely struck arcuate segments tangentially connected to straight line segments and the kicker means includes a push rod member having a contact surface generally perpendicular to one of the tangential segments when actuated to give a positive, discreetly varying force as the bearings are injected into the annular bearing space.

In accordance with still yet another aspect of the invention, the system is so arranged that the assembly of the bearings within the gear is checked by the insertion of a pilot shaft through the opposite end of the receiving object while the recover block is filling the annular bearing space with needle bearings to maintain the straight line relationship of all of the operative steps of the process while diminishing the overall assembly time.

It is thus an object of the invention to provide a needle bearing assembly which uses a positive displacement mechanism to insure the complete filling of an annular bearing space defined in part by a mandrel.

It is yet another object of the invention to provide a mechanism for providing solid lubricant or packing about the surfaces of the needle bearings prior to their assembly into the bore of the receiving object.

It is another object of the invention to provide an improvement in a needle bearing assembly machine which materially decreases the time to assemble such bearing.

It is yet another object of the invention to provide a bearing assembly machine which accurately and precisely places needle bearings in the bore of a receiving object in a consistently repeatable manner.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE PREFERRED EMBODIMENT

Figure 2:
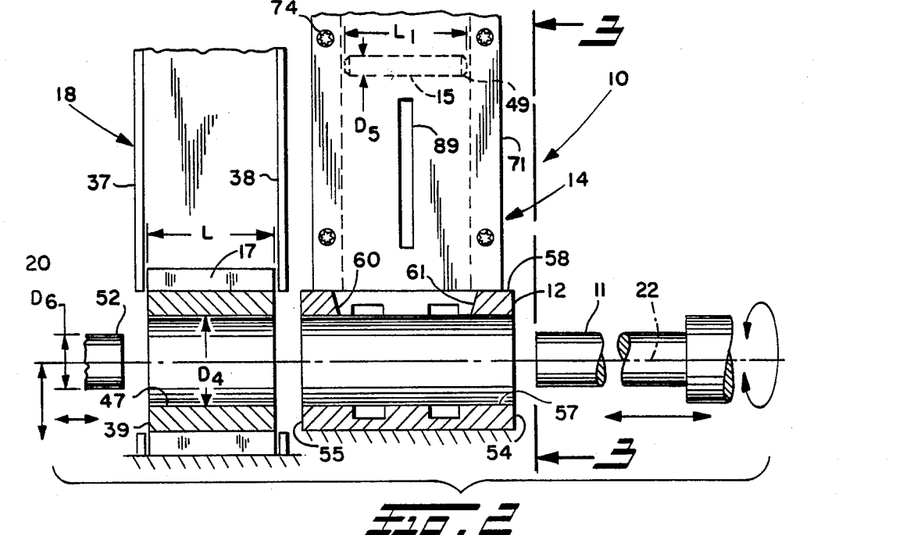
FIG. 2 is a schematic side view showing the principal components utilized in the present invention.

Referring now to the drawings wherein the showings are for the purpose of illustrating a preferred embodiment of the invention only and not for the purpose of limiting the same, FIG. 2 shows schematically the major components of a bearing assembly machine 10 which includes a stepped shaft mandrel 11, a recover block 12, a track guide member 14 for receiving needle bearings 15 which are to inserted into the hub or bore of gear member 17 in turn held in place by transfer station 18 at the rear of which is a pilot shaft tester 20. Pilot shaft tester 20, gear member 17, recover block 12 and stepped shaft mandrel 11 are all axially aligned on longitudinal center line 22. This means that the entire assembly operation takes place at one position. No assembly operation has to occur at any other station such as greasing the gear or checking the gear for accurate needle bearing installation as heretofore done.

Figure 4:
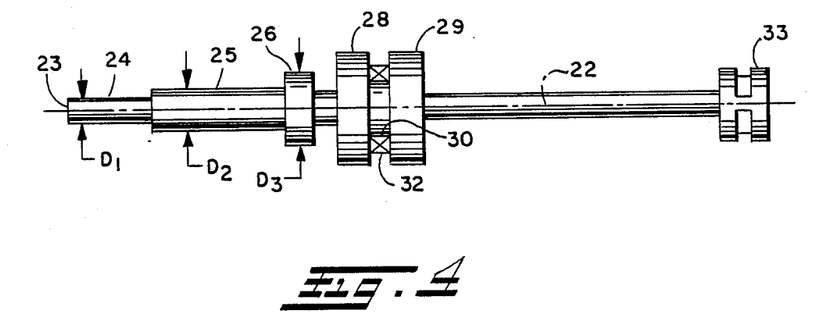
FIG. 4 is a schematic illustration of the mandrel used in the present invention.

Referring now to FIGS. 2 and 4 stepped shaft mandrel 11 comprises, beginning with its entry end 23, a collecting mandrel portion 24 of diameter $D_1$, a pusher portion 25 of diameter $D_2$ and a stop portion 26 of diameter $D_3$. Spaced from stop portion 26 are two spaced cylindrical sections 28, 29 between which is a cylindrical, reduced diameter bearing section 30 which is journaled in a journaled bearing schematically illustrated at 32. At the rearward end of stepped shaft 11 is a configured driving portion 33. Stepped shaft 11 is rotatable about longitudinal center line 22 and axially movable along longitudinal center line 22 by driving portion 33 and journal bearing 32. In practice, driving portion 33 is chucked into the spindle of a lathe or other similar machine and journal bearing 32 secured to movable feed stock rails so that stepped shaft 11 is accurately supported at two axially spaced distances. In practice, journal bearing 32 comprises two U-shaped or C-shaped members, the bottom of which is fixed and the top of which is pivoted at one side and inverted over the other member to provide the journal bearing support indicated at 32.

Figure 6:
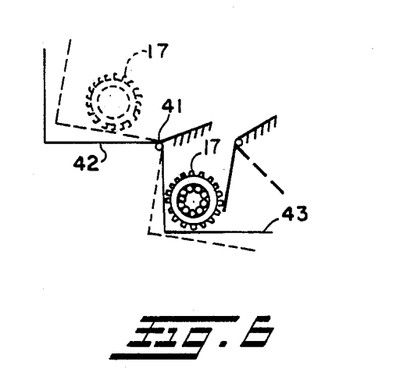
FIG. 6 is a schematic illustration of a transfer mechanism used in the present invention.

Referring now to FIGS. 2 and 6, transfer station 18 is positioned at the opposite end of recover block 12 from which stepped shaft mandrel 11 is positioned and essentially includes an inside guide rail 37, an outside guide rail 38 and a generally flat rolling track surface 39. Inner guide rail 37 is obviously positioned a distance from recover block 12 which is less than the length of needle bearings 15. Dimensionally guide rails 37, 38 are positioned relative to track surface 39 to be slightly in excess of the length of gear member 17 to prevent gear member 17 from being skewed during insertion of needle bearings 15 into gear member 17. Also rolling track surface 39 is orientated relative to longitudinal center line 22 to insure that the center of gear member 17 is coincident with longitudinal center line 22. If desired, guide rails 37, 39 can be increased in height to extend past the opening in gear member 17 after needle bearings 15 are inserted into gear member 17 and gear member 17 rolls on rolling track surface 39 out of registry with longitudinal center line 22 to insure that needle bearings 15 do not axially move out of the bore of gear member 17.

Conceptually, any transfer mechanism can be used to position gear member 17 so that its axial center line coincides with longitudinal center line 22. One such arrangement is schematically shown in FIG. 6 and transfer station 18 can be viewed as a walking beam mechanism pivoted as at 41 to permit gear member 17 to roll by gravity from a first rolling track surface portion 42 to a second rolling track surface portion 43 whereat needle bearings 15 are assembled within gear member 17. If desired, some form of a pivotal locking latch 45 can be employed to insure the positioning of gear member 17 at the aligned position shown in FIG. 2. Obviously, other transfer station arrangements could be employed. For example, a four bar linkage could be used to lift gear member 17 from first rolling track surface portion 42 to second rolling track surface portion 43 or, alternatively, a pneumatic cylinder could simply push the gears on a straight track with appropriate locking latches 45 synchronized with the cylinder's actuation.

Figure 8:
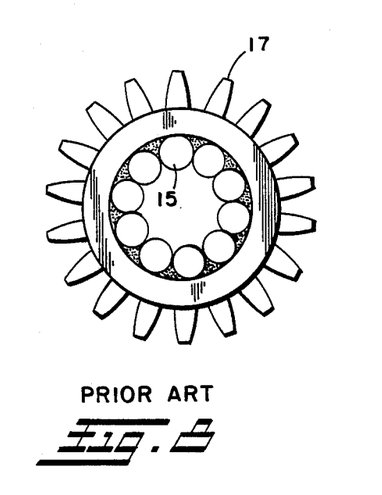
FIGS. 8 and 8a illustrate the distribution of the grease among the needle bearings in the prior art and the present invention, respectively.

Gear member 17 is shown in FIGS. 2 and 8 for purposes of illustration to be a conventional spur gear although gear member 17 could be any other type of a gear, or as noted above, the term gear member as used herein is broad enough to mean a bearing, joint, hub, etc., so long as gear member 17 has a cylindrical bore 47. While bore 47 is shown to axially extend through gear member 17 in the preferred embodiment, bore 47 could be a blind bore such as for example would exist in an application where needle bearings are inserted into the end caps used in a universal joint for an automobile's drive shaft. For definitional purposes, bore 47 in gear member 17 has a diameter designated as $D_4$ and a length designated as L. The length L must be at least equal to the length $L_1$ of needle bearings 15. Needle bearings 15 are simply cylindrical hardened pins, preferable polished, with chamfered ends 49 and a diameter defined for definitional purposes as $D_5$. As used herein, the term needle bearing simply means a cylindrical rod.

Figure 7:
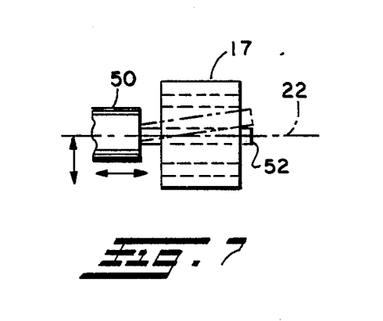
FIG. 7 is a schematic view of the pilot shaft used to test the assembly.

On the axial end of transfer station 18 opposite the end of transfer station 18 which faces recover block 12 is positioned pilot shaft tester 20 coaxially centered with longitudinal center line 22. As schematically indicated in FIGS. 2 and 7, a pneumatically actuated cylinder 50 inserts a pilot shaft stub 52 into bore 47 of gear member 17 after needle bearings 15 have been assembled in bore 47. The diameter $D_6$ of pilot shaft stub 52 is slightly less than diameter $D_4$ of gear member 17 less two times diameter $D_5$ of needle bearing 15. Also, diameter $D_6$ is equal to diameter $D_1$ of stepped shaft mandrel 11 which is equal to the diameter of the shaft to which gear member 17 is finally assembled. Pneumatic cylinder 50 (or any other actuating mechanism such as a hycdraulic cylinder or an electric solenoid and the like) axially moves (or is axially moved) pilot shaft stub 15 along longitudinal center line 22 into bore 47 whereat a lateral movement on pilot shaft stub 52 is exerted as indicated by the direction of the arrows in FIGS. 2 and 7. Should there be a mishap in the assembly operation such that one or two needle bearings were not placed within bore 47 of gear member 17, pilot shaft stub 52 would tend to assume the position shown schematically by the dotted lines in FIG. 7 and this would result in a rejection of the gear.

As thus far described, gear member 17, needle bearing 15, pilot shaft 20, transfer station 18 and stepped shaft mandrel 11 are convention elements per se and have been used in prior bearing assembly machines. Similarly, recover block 12 and track guide member 14 in a functional sense as described above have also been used in prior art bearing assembly machines.

Figure 5:
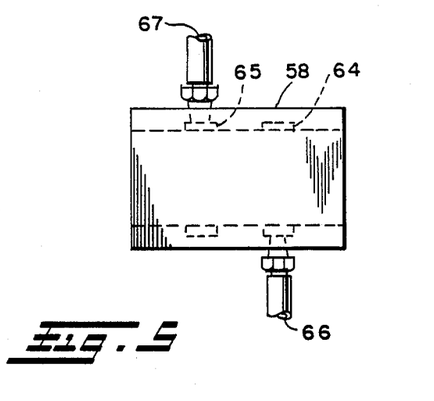
FIGS. 5 and 5a are schematic views of the recover block used in the present invention.
Figure 5A:
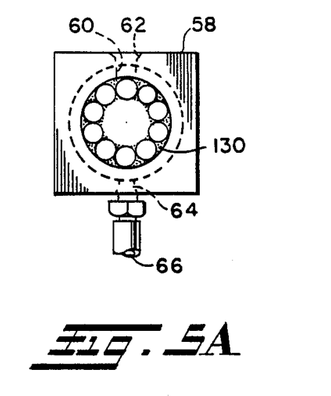

Recover block 12 is a square or rectangular block having an axial entry end 54 and an axial exit end 55 with a cylindrical bore 57 extending axially therethrough and positioned coaxial with longitudinal center line 22. As shown in FIGS. 2, 5 and 5a, recover block 12 has a longitudinally extending needle bearing slot 60 extending from a top surface 58 of recover block 12 into cylindrical bore 57. Slot 60 is chamfered (or tapered) in a longitudinal direction as at 61 and in a transverse direction as at 62 to function as guide surfaces so that needle bearings 15 enter bore 57 in a proper attitudinal relationship. The bottom of needle bearing slot 60 at its juncture with cylindrical bore 57 has a longitudinal length slightly in excess of needle bearing length $L_1$ and a width slightly in excess of diameter $D_5$ of needle bearing 15. Also in communication with cylindrical bore 57 are two annular grease grooves 64, 65 which in turn are connected through recover block to grease fittings 66, 67 respectively although recover block 12 could be configured so that annular grease grooves 64, 65 could be in communication with one another and only one grease fitting be used. Also, only one annular groove in theory need be used. Annular grease grooves 64, 65 are shown in FIGS. 2 and 5 are positioned so as not to extend beyond the longitudinal length (approxiamtely $L_1$) of needle bearing slot 60 so that the grease admitted through grease grooves 64, 65 is directed substantially along the length of needle bearings 15.

Figures 1, 1A:
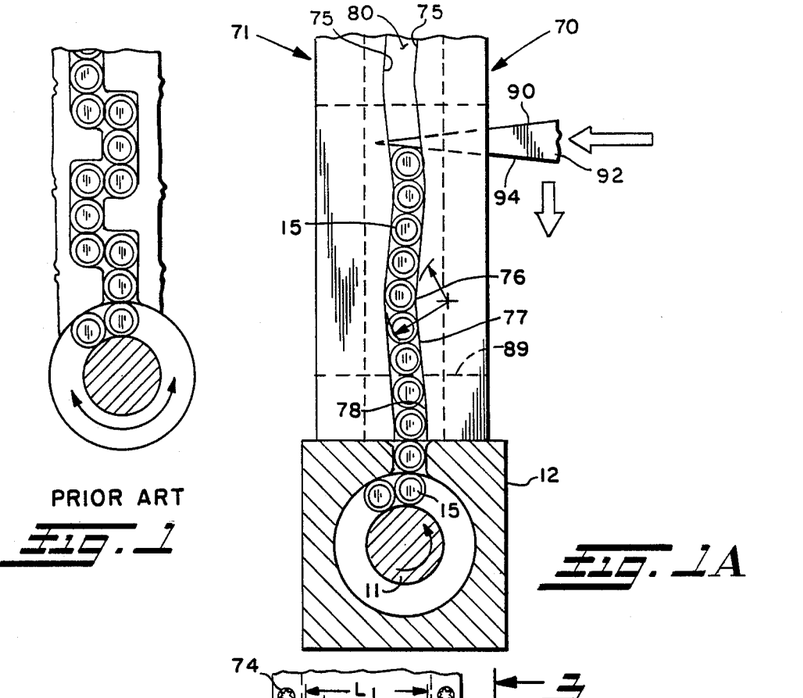
FIGS. 1 and 1a schematically illustrate side elevation views of the track used to convey bearings in the present invention and the prior art, respectively.
Figure 3:
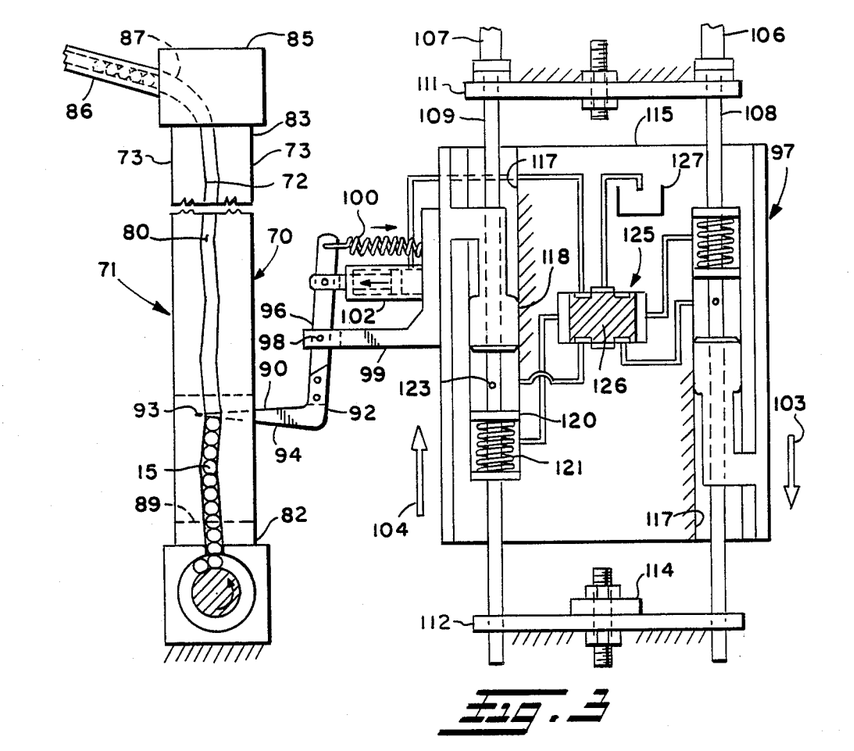
FIG. 3 is a schematic view taken along lines 3—3 of FIG. 2.

Referring now to FIGS. 1, 2 and 3 track guide member 14 essentially comprises a vertically-extending right hand track guide 70 and a vertically-extending left hand track guide 71 and is positioned on top surface 58 of recover block 12 and in registry with needle bearing slot 60.

Right hand track guide 70 and left hand track guide 71 have a serrated retaining surface 75 which, as best shown in FIG. 1a, is identical for both right and left hand track member track guides 70, 71. As shown in FIG. 2 serrated retaining surface 75 extends a longitudinal distance slightly greater than length $L_1$ of needle bearings 15 and spacers 74 are used to fasten right hand track guide 70 to left hand track guide 71 so that a serrated or serpentine track 80 is formed between serrated retaining surfaces 75 of right and left hand track guide 70, 71 for receiving a plurality of needle bearings 15 therein and permitting a downward flow of needle bearings 15 in serpentine track 80. Track guide member 14 is secured at its bottom end 82 in a removable manner through conventional means (not shown) to recover block 12. Track guide member 14 has a top end 83 to which is secured a conventional collecting block 85 which receives a stream of needle bearings 15 from a gravity feed hose 86 and funnels needle bearings 15 through passage 87 into serrated track 80. Thus, by gravity a steady stream of needle bearings 15 is fed through gravity feed hose 86 collecting block 85 through track guide member 14 and thence through needle bearing slot 60 and recover block 12 into cylindrical bore 57 of recover block 12.

In theory, serrated retaining surface 75 could be formed by a series of reversely struck arcuate surfaces smoothly blending into one another or, alternatively, by a sinusoidal curve. However, it is preferred that serrated retaining surface 75 is constructed by an arcuate segment 76 blending into a tangentially straight segment 77 which in turn blends into a reverse arcuate segment 78 having the same radius as arcuate segment 76 but struck from the opposite side. For definitional purposes arcuate segment 76, tangential segment 77 and reverse arcuate segment 78 form on serration which regularly repeats itself along the length of retaining surface 75. The vertical drop of tangential surface 77 and the angle it is tangential to arcuate surfaces 76, 78 is established so that a controlled movement of needle bearings 15 will occur by gravity.

Formed in each track guide, 70, 71 at the midpoint of the longitudinal center of serrated surface 75 is a vertically extending kicker slot 89 of slight width. When right hand track guide 70 is assembled to left hand track guide 71, kicker slot 89 in each track guide 70, 71 is aligned with and in a registry with one another. Adapted to move into and out of kicker slot 89 is a kicker push rod member 90. Referring now to FIGS. 1a and 3 kicker push rod member 90 has a push rod portion 92 with a pointed end 93 which permits push rod portion 92 when pivoted into kicker slot 89 to slide between adjacent needle bearings 15 without jamming. Push rod portion 92 also has a flat push surface 94, which, when push rod portion 92 is pivoted into kicker slot 89 is generally perpendicular to one of the tangential portions 77 of serrated retaining surface 75. This relationship assures the exertion of a positive, smooth acting downward force exerted on the column of needle bearings 15 positioned beneath push surface 94 of kicker push rod member 90. It can be visualized that the force has a maximum downward vector which moves to a minimum after passing one of the reverse arcuate segments 78 and then to a maximum to "squeeze" a plurality of needle bearings 15 into recover block 12 which is then followed by a second plurality, etc.

Push rod portion 92 is made of a wear resistant, replaceable, carbide steel which is pinned to a pivoting portion 96 of kicker push rod member 90. Pivoting portion 96 in turn is connected in a pivotal manner to an actuator 97 and specifically kicker push rod member 90 is pinned at 98 to a trunnion 99 which is part of actuator 97 and a spring 100 is positioned at or near the end of pivoting portion 96. Spring 100 is effective to force kicker push rod member 90 to pivot at 98 to cause push rod portion 92 to enter kicker slot 89. A release member 102 shown as a pneumatic cylinder is effective to overcome the force of spring 100 and cause kicker push rod member 90 to pivot at pin joint 98 so that push rod portion 92 is moved out of registry with kicker slot 89. Actuator 97 is operative to mover downwardly in a direction of arrow 103 when the force of spring 100 is operative to maintain push rod portion 92 in registry with kicker slot 89 to forceably feed a plurality of needle bearings into recover block 12 and then to move upwardly in a direction of arrow 104 at which time release member 102 is actuated to overcome the force of spring 100 and move pivoting portion 96 out of kicker slot 89. Thus the track guide member 14, the kicker push rod member 90 and the actuator 97 form the pin feed mechanism for positively feeding a discreet plurality of needle bearings 15 into recover block 12.

Any known conventional actuator mechanism can be employed to achieve the desired motion of kicker push rod member 90. An air actuated mechanism is disclosed in FIG. 3 although hydraulic or electrical arrangements are obvious alternatives. In the embodiment shown, right and left hand air supply lines 106, 107, respectively, are connected respectively to right and left hand air supply pipes 108, 109, respectively, which are immovable and are fixed to a stationary top support 111 and a stationary bottom support 112. Each stationary support 111, 112 carries an adjustable gauge block 114 and the case or housing 115 of actuator 97 travels vertically upwardly and downwardly between gauge blocks 114. A fixed cylinder 117 is secured to each air supply pipe 108, 109 and carries therein a moveable piston 118 secured to actuator case 115. Also positioned within each cylinder 118 is a spring biased poppet piston 120 biased into the position shown by spring 121. An opening 123 in each air supply pipe 108, 109 admits air between piston 118 and poppet piston 120. Viewing now the operation of actuator 97 from the air pressure supplied through left hand air supply line 107 which controls upward travel of actuator 97 as indicated by arrow 104, air enters cylinder 117 at 123 to move piston 118 upwardly within cylinder 117 until transfer case 115 contacts gauge block 114 at top support 111 at which time the air within cylinder 117 builds in pressure until it overcomes the force of spring 121 opening poppet piston 120 at which time the right hand air supply line 106 becomes effective to move actuator in the downward direction indicated by arrow 103 until transfer case 115 strikes gauge block 114 at bottom support 112. When actuator 97 is moving in the upward direction of arrow 104 air pressure from left hand line 107 is effected to also actuate release member 102. The sychronization of cylinders 118 from left and right hand air supply lines 106, 107 can be controlled through any number of known conventional mechanisms and one such synchronizing mechanism which can be employed is a simple spool valve 125. Spool valve 125 is shown in a neutral unactuated position in FIG. 3 but the spool piston 126 is moved in one direction or the other once poppet piston 120 overcomes spring force 121 and once biased, the pressure in cylinder 117 is dumped to a reservoir 127 in a known conventional manner thus permitting pressure to build in the opposite cylinder 117 until it, in turn, cracks open its poppet piston causing spool piston 126 to shuttle in the opposite direction. To synchronnize actuation of the piston in the pneumatic cylinder of retainer 102 to correspond with upward movement indicated by arrow 104 of actuator 97 the cylinder of retainer 102 is ported as shown into cylinder 117 of left hand air supply line 107 through spool valve 125.

The cycle of bearing assembly machine 10 will now be described with the collecting mandrel portion of stepped shaft mandrel 11 longitudinally positioned within cylindrical bore 57 of recover block 12 whereat, as shown in FIG. 5a, an annular bearing space 130 having a radial distance slightly larger than needle bearing diameter $D_5$ exists. Serrated track 80 is filled with a vertically extending column of needle bearings 15 and the push rod portion 92 of kicker push rod 90 is engaged in kicker slot 89 and as schemtically illustrated in FIG. 1 actuating mechanism 97 is moving downwardly while stepped shaft mandrel 11 is rotating and a predetermined amount of grease is being simultaneously exerted through fittings 66, 67 into annular grooves 64, 65. The positively engaged downward stroke of actuator 97 forces a predetermined number of needle bearings into annular space 130 which are being thoroughly greased about their diameters as a result of the rotating motion of stepped shaft mandrel 11. It is preferred that the grease be injected while needle bearings 15 are being forceably displaced into annular bearing space 130 although, satisfactory greasing will occur if the grease is injected after kicker push rod member 90 reaches the bottom of its stroke. The result is that a layer of grease is substantially injected about each individual needle bearing 15 in bearing annular space 130 significantly improving the adhesive retention characteristics of the grease packing to retain needle bearings 15 in their annular assembly position while also enhancing the lubrication life of the bearings after gear member 17 is finally assembled onto its shaft.

When annular bearing space 130 is filled, actuator case contacts with gauge block 114 and results in a retraction of push rod portion 92 as described above. While the travel of actuator 97 is carefully controlled vis-a-vis gauge block 114, should there be an "override" the pivot 98 will simply allow the pusher rod portion 92 to ride up or increase its angular relationship with that particular needle bearing 15 it is in contact with. The override compensating arrangement inherent in the pivoted kicker is an important aspect of the invention. Also, while kicker push rod 90 is traveling downward, needle bearings 15 are rolling in serrated track guide 80 to take up the space vacated by those needle bearings 15 inserted into annular bearing space 130. When kicker push rod 90 is withdrawn from kicker slot 89, pusher portion 25 of mandrel 11 enters bore 57 of recover block 12 to force needle bearings 15 in annular bearing space 130 into bore 47 of gear member 17. During this time actuator 97 is moving upward relative to track guide member 14 and is fast enough to re-engage kicker slot 89 while needle bearings 15 in the annular bearing space 130 are inserted into gear member 17. However, pusher portion 25 occupies annular bearing space 130 and prevents entry of needle bearings 15 into recover block 12. In addition, there is a slight delay in the motion of actuator 97 at the top and bottom of its stroke which results as the air pressure builds up in cylinder 118. This delay is beneficial to the overall smoothness of the cycle. Preferably, rotation of stepped shaft mandrel 11 continues to assure uniform distribution of the grease packing within gear member 17. The stepped shaft mandrel is then moved axially and repositioned with its collecting mandrel portion 26 within bore 57 of recover block 12. Pilot shaft tester 20 is then actuated to test the bearing assembly in gear member 17.

In the prior art bearing machine described above, the track feed mehcanism as schematically shown in FIG. 1 relied solely on gravity to feed the needle bearings into the annular bearing space. To insure filling the annular bearing space the stepped shaft mandrel had to oscillate and was even modified by forming a relief (not shown) in its profile to assure shuttling the bearings alternatively from one side to the other. This was the principal limiting factor controlling the speed of the cycle to slightly over four seconds for a gear requiring about 10 to 20 needle bearings within a bore of about $\frac{1}{2}''$ in diameter. In contrast, the cycle speed using the present invention for the same application is about 2½ seconds. In addition, there was a tendency, at times, in the prior art machine to skew needle bearings relative to the longitudinal center line which occasionally resulted in an assembly having one less bearing than required resulting in a higher rejection rate than that achieved with the present invention since the kicker push rod 90 forces needle bearings 15 into proper alignment within annular bearings space 13a.

Figure 8A:
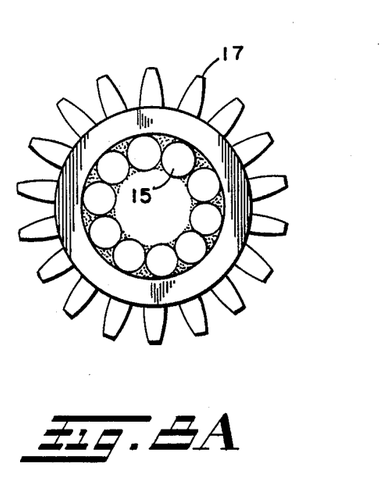

In addition to bearing machine 10 providing a significantly faster more accurate assembly than that produced in the prior art, the grease packing distribution is significantly improved when comparing the prior art machine to machine 10 of the present invention. As shown in FIGS. 8 and 8a in the prior art process, the grease was applied to bore 47 of gear member 17 prior to inserting needle bearings 15 collected in an annular array within the recover block. Even though stepped shaft mandrel 11 was rotated within gear member 17 the grease remained mostly between bore 47 and needle bearings 15. This weakend the adhesive characteristics of the grease packing tending to cause a collapse of the bearing assembly within gear member 17 if shipped without a pilot or dummy shaft. Also the packing did not, at least initially, provide the lubrication when gear member 17 was finally installed on its shaft which is achieved by machine 10 of the present invention.

The invention has been described with reference to a preferred embodiment. It is apparent that many modifications, such as several suggested in the description above, may be made to the invention without departing from the spirit or essence of the invention. For example, it is conceivable that the invention could be used to assemble ball bearings and other anti-friction bearings into a raceway of a gear member. It is my intention to include all such modifications and alterations insofar as they are within the scope of my present invention.

It is thus the essence of my invention to provide a method and apparatus for assembling anti-friction bearings with a grease packing which uses a positive, force actuated drive to automatically position a plurality of anti-friction bearings about a collecting mandrel in the desired relationhip for subsequent transfer to a receiving member.

Having thus described my invention, the following is claimed:

1. A system for assembling anti-friction, needle bearings into a cylindrical opening of a receiving object, said receiving object to be subsequently inserted with said bearings over a shaft, said system comprising:
   (a) a recover block having a longitudinally-extending cylindrical bore extending therethrough of diameter substantially equal to said opening in said receiving object, said recover block further having a longitudinally-extending slot in communication with said bore and a forward axial face at one end of said bore and a rearward axial face at the other end of said bore;
   (b) a collecting mandrel having a stepped shaft including a first longitudinally-extending cylindrical shaft portion of a first diameter, a second longitudinally-extending cylindrical shaft portion of a second diameter extending therefrom, said first and second diameters being smaller than the diameter of said opening in said receiving object and said bore in said recover block;
   (c) transfer station means for locating said receiving object adjacent said rearward axial face with said opening concentric with said bore;
   (d) mandrel actuating means for longitudinally moving and positioning said mandrel from a first position whereat said first shaft diameter portion is centered within said bore to define an annular bearing space and a second position whereat said second shaft portion is centered within said bore and said first shaft portion is centered within said opening of said receiving object;
   (e) lubricating means for providing a grease lubricant in said annular space when said mandrel actuating means is in said first position, said lubricating means further includes at least one annular groove in said recover block opening toward said block's bore, and means for injecting grease lubricant under pressure into said annular groove whereby said grease lubricant is interspersed between adjacent needle bearings;
   (f) pin feeding means for positively feeding by exteriorly applied forces a discrete number of said needle bearings through said slot so that said annular space is filled with said needle bearings longitudinally aligned side by side when said mandrel actuating means is in said first position, said mandrel actuating means further effective to transfer said needle bearings in an annular array into said opening of said receiving object in said second position and to rotate said first portion in said first position while said pin feeding means is actuated, said rotation continuing while said lubricating means is activated; said pin feeding means includes track means for holding a plurality of needle bearings in longitudinal alignment, generally one on top of the other, in a vertically extending column configured to prevent all said bearings from freely falling by gravity therethrough; and
   (g) said pin feeding means further includes kicker means interacting with said track means to force a discrete number of said needle bearings into said annular space.

2. The system of claim 1 wherein said track means further includes a first guide member having a serrated face surface extending a distance substantially equal to the length of said needle bearings, a second guide member having a serrated face surface extending a distance substantially equal to the length of said needle bearings, means joining said guide members together so that said serrated face surface of said first member faces said serrated face surface of said second member at a spaced distance therebetween to define a serpentine track, and mounting means so that said track at one vertical end of said guide members is positioned in communication with said slot.

3. The system of claum 2 further including gravity feed means at the opposite vertical end of said guide members for feeding said needle bearings singularly into the top end of said serpentine track.

4. The system of claim 3 wherein said kicker means includes a kicker push rod member, actuator means for moving said kicker push rod member into said track between adjacent needle bearings in an extended position and downwardly a discrete distance.

5. The system of claim 4 wherein said actuator means is further effective to move said kicker push rod member out of said track and upwardly a discrete distance after said kicker push rod member has moved said discrete downward distance.

6. The system of claim 5 wherein each of said face surfaces has a vertically extending repeating pattern of serrations formed therein, each serration having a first arcuate segment, an oppositely facing second arcuate segment and a straight line segment therebetween tangential to said first and second arcuate segments, said serrations of each face surface aligned with the other face surface, said serrations extending transversely to the height of said track guides a distance at least equal to the length of said needle bearings, and spaced apart from one another a distance slightly greater than the diameter of said needle bearings.

7. The system of claim 6 wherein said kicker push rod member has a pivotal portion and a push rod portion, said push rod portion having a pointed end and a generally flat base surface extending therefrom, said base surface generally perpendicular to one of said tangential segments when said actuator means pivots said base portion into said kicker slot.

8. The system of claim 1 further including pilot shaft means for testing said bearing assembly once said annular array of bearings is positioned within said cylindrical opening of said receiving member, said pilot shaft means including a pilot shaft adjacent said transfer station means and axially aligned with said cylindrical bore in said recover block and means to laterally move said pilot shaft and to detect lateral movement of said shaft to determine if any bearings are missing in said bearing assembly.

9. A method for assembling needle bearings within a cylindrical opening of a receiving object, comprising the steps of:
   (a) providing a recover block having a longitudinally-extending bore therethrough, a slot at the top of said block in fluid communication with said bore and at least one annular groove in said block in communication with said block's bore;

(b) providing a stepped shaft mandrel having shaft portions of first and second diameters less than said diameter of said cylindrical opening;

(c) providing a track having a serpentine vertically extending opening in communication with said slot;

(d) positioning said first shaft portion of said mandrel in centered relationship within said bore to define an annular bearing space;

(e) feeding a plurality of needle bearings, one on top of the other within said track into said annular bearing space while rotating said mandrel;

(f) injecting a grease lubricant under pressure from said groove at least after said needle bearings have filled said annular bearing space while rotating said first stepped portion of said shaft to insure said grease substantially surrounds all said needle bearings in said annular bearing space;

(g) longitudinally moving said mandrel's second shaft portion into said opening in said recover block whereby said needle bearings around said first shaft portion are displaced from said bore into said opening in said receiving member; and (h) providing a kicker member, and inserting said kicker member into said track between adjacent needle bearings, and moving said kicker member downwardly a discrete distance to force said needle bearings into said space.

10. The method of claim 9 further including the steps of withdrawing said kicker member from said track after said bearings have filled said annular space, moving said kicker member upwardly relatively to said track a discrete distance and inserting said kicker member into said track between two adjacent needle bearings.

11. The method claim 10 further inlcuding the steps of providing a vertically movable actuator and a trunnion on said actuator pinned to said kicker member, and pivoting said kicker member into said track when said actuator moves downwardly and pivoting said kicker member out of said track when said kicker moves out of said track.

12. The method of claim 11 further including the steps of providing said serpentine track with a serrated surface having straight line segments tangential to reverse arcuate segments, providing a flat base surface on said kicker member and pivoting said kicker member into said slot to contact a needle bearing such that said flat base surface is generally perpendicular to a tangential segment.

13. The method of claim 12 further including the step of additionally pivoting said flat base surfacee after said annular bearing space has been filled with needle bearings and prior to moving said actuator upwardly whereby said kicker member is no longer generally perpendicular to said tangential segment.

14. The method of claim 13 further including the step of hesitating said upward and downward travel of said actuator before reversing travel direction of said actuator.

15. The method of claim 14 further including accomplishing the steps of assembling all bearings into said recover block and transferring said bearings from said recover block into said receiving object in about two and a half seconds.

16. The method of claim 9 further including the step of providing a pilot shaft adjacent said receiving object's cylindrical opening but opposite the side, through which said mandrel is inserted, said pilot shaft being longitudinally concentric with said bore, and after placing said bearings into said opening of said receiving object inserting said pilot shaft into said opening and wiggling said pilot shaft to detect radial movement thereof.

17. The method of claim 16 further including the step of rotating said mandrel when said bearings are transferred into said opening of said receiving member.

18. The method of claim 17 further including accomplishing the steps of assembling all bearings into said recover block and transferring said bearings from said recover block to said receiving object in about two and a half seconds.

19. The method of claim 9 further including accomplishing the steps of assembling all bearings into said recover block and transferring said bearings from said recover block to said receiving object in about two and a half seconds.

* * * * *